(12) United States Patent
Anselmann et al.

(10) Patent No.: US 7,226,503 B2
(45) Date of Patent: Jun. 5, 2007

(54) EFFECT PIGMENTS BASED ON COATED GLASS FLAKES

(75) Inventors: Ralf Anselmann, Ramsen (DE); Klaus Ambrosius, Dieburg (DE); Marcus Mathias, Gernsheim (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 10/473,710

(22) PCT Filed: Apr. 11, 2002

(86) PCT No.: PCT/EP02/04020

§ 371 (c)(1),
(2), (4) Date: Nov. 10, 2003

(87) PCT Pub. No.: WO02/090448

PCT Pub. Date: Nov. 14, 2002

(65) Prior Publication Data

US 2004/0134385 A1 Jul. 15, 2004

(30) Foreign Application Priority Data

May 9, 2001 (EP) ................................. 01111320

(51) Int. Cl.
*C04B 14/00* (2006.01)
*C09C 1/00* (2006.01)
*C09C 1/28* (2006.01)
*B32B 17/00* (2006.01)
*B32B 18/00* (2006.01)

(52) U.S. Cl. ...................... 106/489; 106/415; 106/436; 428/404; 428/406

(58) Field of Classification Search ................ 106/436, 106/439–442, 451, 456, 449, 415, 417, 489; 428/404, 406
See application file for complete search history.

(56) References Cited

U.S. PATENT DOCUMENTS

| | | | |
|---|---|---|---|
| 3,087,828 A | | 4/1963 | Linton et al. |
| 3,138,475 A | | 6/1964 | Schroder et al. |
| 3,331,699 A | | 7/1967 | Marshall et al. |
| 4,867,793 A | | 9/1989 | Franz |
| 5,221,341 A | * | 6/1993 | Franz et al. ................. 106/449 |
| 5,433,779 A | | 7/1995 | DeLuca, Jr. |
| 5,436,077 A | | 7/1995 | Matsuba et al. |
| 5,540,769 A | | 7/1996 | Franz |
| 5,753,371 A | | 5/1998 | Sullivan et al. |
| 5,972,434 A | * | 10/1999 | Kajander ................. 427/389.8 |
| 6,045,914 A | * | 4/2000 | Sullivan et al. ............. 428/404 |
| 6,132,873 A | | 10/2000 | Dietz et al. |
| 6,284,032 B2 | | 9/2001 | Andes et al. |
| 6,517,628 B1 | | 2/2003 | Pfaff et al. |
| 6,596,070 B1 | | 7/2003 | Schmidt et al. |
| 6,599,355 B1 | * | 7/2003 | Schmidt et al. ............. 106/417 |
| 6,648,956 B1 | * | 11/2003 | Hechler et al. ............. 106/415 |
| 6,689,205 B1 | | 2/2004 | Bruckner et al. |
| 6,767,633 B2 | | 7/2004 | Steudel et al. |

FOREIGN PATENT DOCUMENTS

| | | | |
|---|---|---|---|
| DE | 19951871 | * | 5/2001 |
| DE | 100 18 904 | | 10/2001 |
| EP | 1 045 014 | | 10/2000 |
| JP | 6116508 A2 | | 4/1994 |
| JP | 7-246366 | | 9/1995 |
| JP | 10279828 A | | 10/1998 |
| WO | WO97 46624 | | 12/1997 |
| WO | WO99/20695 | | 4/1999 |

OTHER PUBLICATIONS

Bansal, N.P., Doremus, R.H., Handbook of Glass Properties, 1986, Academic Press, Inc, p. 34, ISBN 0-12-078140-9.*
Shelby, James E., Introduction to Glass Sciences and Technology, 1997, The Royal Society of Chemistry, pp. 220-221.*
Ketex, K. E. Textile Pvt. Ltd., webpages, 2002, KE Technical Textile Private Limited, pp. 1-5.*
Saint-Gobain Vetrotex, Glass Strand webpages, 2001, Saint-Gobain Vetrotex International, pp. 1-4.*
Hartman et al., High Strength Glass Fibers, written in 1996, Publication No. LIT-2006-111, 2006 AGY, pp. 1-12.*
Patent Abstracts of Japan, "Production of Flaky Material Coated With Titania or Zirconia", Apr. 26, 1994, (Chem. Abs. 121 (18) 207716A); JP116508A2.
Patent Abstracts of Japan; vol. 1999, No. 01, Jan. 29, 1999 & JP 10 279828 A (MerckX Japan), Oct. 20, 1998.
YTH Translation JP(A) H6-116508—Translation of JP(A) H6-116508, Applied: Oct. 6, 1992—Application No. H4-267113, Laid-Open Date: Apr. 26, 1994—"Manufacturing Method Of Flaky Substance Coated With Titania Or Zirconia", Kazuhiro Doushita et al.
English translation of JP 7-246366—"A Pearlescent Material and a Paint That Contains Same", Inventor: Kiwa Yamane.
New glass flake Pigment "Metashine" "Crystal Star" Toyo Aluminium K.K. Powder Paste Division, published Jul. 3, 1998.
G. Pfaff, et al., "Angle-Dependent Optical Effects Deriving from Submicron Structures of Films and Pigments", *Chemical Reviews*, vol. 99, No. 7, pp. 1963-1981 (1999).

* cited by examiner

*Primary Examiner*—J. A. Lorengo
*Assistant Examiner*—Elizabeth A. Bolden
(74) *Attorney, Agent, or Firm*—Millen, White, Zelano & Branigan PC

(57) ABSTRACT

The present invention relates to effect pigments based on thin glass flakes and to a method for the production of such pigments. The resulting pigment can be used in any application for which pearlescent pigments have been heretofore used such as, for example, in plastics, paints, inks, cosmetic formulations, coatings including solvent or waterborne automotive paint systems, powder coatings, inks and agriculture foils.

12 Claims, No Drawings

EFFECT PIGMENTS BASED ON COATED GLASS FLAKES

The present invention relates to effect pigments based on thin glass flakes, to a method for the production of such pigments and their use in plastics, paints, coatings, powder coatings, inks, printing inks, glasses, ceramic products, agriculture foils, and in cosmetic formulations.

Since more than 40 years iridescent luster effects can be achieved using so called nacreous or pearlescent pigments. Various alternative techniques have been developed to create colour/lustre effects. The most important, economic and common way to make these pigments is to coat a platelet shaped carrier with high refractive substances like $TiO_2$, $Fe_2O_3$, $SnO_2$, $ZrO_2$, $Cr_2O_3$ or combinations of these or with alternating layers of high and/or low refractivity. So far the nearly exclusively used carrier is wet ground muscovite mica. It is cheap, readily available and easy to cleave into smooth and very thin platelets. These can be classified into any desired particle size distribution. Additionally, pigments based on mica are very stable towards chemical, mechanical or thermal treatment. But there are some disadvantages of mica, since it is a natural product and shows inconsistencies from source to source and even from batch to batch. This has to be overcome by adjusting the processing parameters. Natural mica contains impurities like quartz which makes the processing more complicated (abrasion of grinding tools, waste) or like Fe, Mn, Cu which makes the masstone yellowish grey rather than white. When ground it yields platelets showing a broad distribution of thicknesses and diameters. This can be reduced by proper classification but will never lead to uniform shape.

In the past researchers tried to find corresponding alternatives to mica which keep the advantages of it but did not contain the above mentioned disadvantages.

A wide variety of other platy materials have been proposed as substitute for mica in the patent literature. These include non-soluble inorganic materials such as glass, enamel, china clay, porcelain, natural stones or other silicaceous substances, metal objects and surfaces of organic polymer materials such as polycarbonate as disclosed for example in U.S. Pat. Nos. 3,123,485, 3,219,734, 3,616,100, 3,444,987, 4,552,593 and 4,735,869. While glass has been mentioned as a possibility on many occasions, for instance in U.S. Pat. No. 3,331,699, commercial pearlescent products are not made using glass and experience has shown that products made using glass as the platelet substrate have rather poor quality.

U.S. Pat. No. 3,331,699 discloses that glass flakes may be coated with a translucent layer of particles of a metal oxide having a high index of refraction, such as titanium dioxide, provided there is first deposited on the glass flakes a nucleating substance which is insoluble in the acidic solution from which the translucent layer of metal oxide is deposited. The patent does not mention the necessity of a smooth transparent film, not particles, being necessary for quality interference pigments to be developed. The patent teaches that the nature of the glass is not critical, but that the presence of the nucleated surface is critical. It is further stated that there are only a small number of metal oxide compounds which are insoluble in the acidic solution and capable of forming a nucleated surface on the glass flakes; tin oxide and a fibrous boehmite form of alumina monohydrate are the only two such materials disclosed. As demonstrated in the examples below, products prepared according to the teachings of this patent are poor in quality.

U.S. Pat. No. 5,436,077 teaches a glass flake substrate which has a metal covering layer on which is formed a dense protective covering layer of a metal oxide such as titanium dioxide. In this patent, the nature of the glass is unimportant, the metallic coating provides the desired appearance and the overcoating of the metal oxide is present to protect the metallic layer from corrosive environments.

EP 0 912 640 B1 teaches the coating of thick flakes of C glass having a first coating comprising iron oxide or rutile titanium dioxide thereon. The disadvantage of C glass is the limited thermal stability. As disclosed in the EP 0 912 640 B1 the rutile pigments prepared according to the corresponding examples were calcined at temperatures not higher than 600° C. It is well known that the calcining temperature is of essential importance for the stability of rutile pigments, especially for outdoor applications. To yield sufficiently stabilized rutile $TiO_2$ layers on a substrate calcining temperatures of at least 800° C. are requested.

For the preparation of pearlescent pigments the transparency and the thickness of the platy substrate are very important. For the first time EP 0 289 240 B1 discloses the manufacturing of extremely thin glass flakes at reasonable costs. According to the claimed process the glass flakes cannot be only made in any desired composition, e. g., from pure $SiO_2$, but also in any thickness tailored for the application wanted down to below 0.8 μm.

It is an object of the present invention to overcome the problems of the prior art and to provide novel effect pigments which have advantageous application properties. This object is achieved by the inventive effect pigments based on very thin glass flakes having the following characteristics:

(1) thickness of the glass flakes $\leq 1.0$ μm
(2) high temperature and mechanical stability
(3) smooth surfaces The present invention relates to effect pigments based on glass flakes with a thickness of $\leq 1.0$ μm coated with one or more layers with a high and/or a low reflective index. The thickness of the glass flakes is preferably $\leq 0.8$ μm and especially $\leq 0.5$ μm. Especially preferred are thin glass flakes with a softening point $\geq 800°$ C.

Glass can be classified for example as A glass, C glass, E glass, ECR glass.

For the present invention quartz glass is preferred but the production of this glass is very expensive. Glass types which fulfill the feature of the requested softening point are quartz glass, and any other glass composition having a softening point of $\geq 800°$ C. Glass flakes which fulfill the requirements are special glasses like e.g. Schott Duran or Supremax types The softening point in the present invention is defined, according to ASTM C 338 as the temperature at which a uniform fiber of glass with a diameter of 0.55–0.75 mm and a length of 23.5 cm increases its length by 1 mm/min when the upper 10 cm is heated at a rate of 5° C./min.

Suitable glass flakes preferably prepared according to EP 0 289 240 B1 are characterized in that they contain an average particle size in the range of 5–1000 μm, preferably in the range of 5–150 μm. Preferred glass flakes have an average particle size in the range of 5–150 μm and a thickness of 0.1–0.5 μm, preferably of 0.1–0.3 μm. The aspect ratio of glass flakes is in the range of 10–300, preferably in the range of 50–200.

The glass particles can be coated with one or more layers selected from the group consisting of metal oxides, metal suboxides, metal fluorides, metal oxyhalides, metals chalcogenides, metal nitrides, metal sulfides, metal carbides, or mixtures thereof.

Examples of suitable metal oxides are $TiO_2$, $Fe_2O_3$, $TiFe_2O_5$, Ti suboxides, $Fe_3O_4$, $Cr_2O_3$, $Al_2O_3$, $SiO_2$, $ZrO_2$, ZnO, $SnO_2$, CoO, $Co_3O_4$, $VO_2$, $V_2O_3$, $Sn(Sb)O_2$ or mixtures thereof. The $TiO_2$ layer tan be in the rutile or anatase modification, preferably the $TiO_2$ layer is rutile. Especially preferred are glass flakes coated with $TiO_2$ and/or $Fe_2O_3$.

Metal sulfide coatings on glass flakes are preferably selected from sulfides of tin, silver, lanthanum, rare earth metals, preferably cerium, chromium, molybdenum, tungsten, iron, cobalt and/or nickel.

The glass flakes can be coated in the same way as e. g. mica based pearl lustre pigments. Coatings with a metal oxide may be accomplished by any known methods, such as hydrolysis of a metal salt by heating or alkali, which deposits hydrated metal oxide, optionally followed by calcination.

In general, the procedure involves the dispersing of the thin glass flake particles and combining that dispersion with a precursor which forms a hydrous metal oxide film coating on the flakes.

After the glass is dispersed in water and placed in an appropriate vessel, the appropriate metal salts are added. The pH of the resulting dispersion is maintained at an appropriate level during the addition of the metal salts by simultaneous feeding a suitable base, for example sodium hydroxide, to cause precipitation of the hydrous metal dioxide on the glass flakes. An aqueous acid, for example hydrochloric acid, tan be used for adjusting the pH. The coated platelets can, if desired, be washed and dried before being calcined to the final pigment. The procedure is described in detail in U.S. Pat. No. 5,433,779 and in the German Patents 14 67 468, 19 59 998, 20 09 566, 22 14 545, 22 15 191, 22 44 298, 23 13 331, 25 22 572, 31 37 808, 31 37 809, 31 51 343, 31 51 354, 31 51 355, 32 11 602 and 32 53 017.

The effect pigments of the present invention are preferably prepared by wet-chemically coating of the glass flakes or by gas phase decomposition of volatile metal compounds (CVD, PVD) or electroless plating.

The effect pigments obtained in this way are characterized in that one or more homogeneous layers enrobing the uniform thin glass flakes.

Preferred effect pigments of the present invention are given in the following:
glass flake+$TiO_2$ (rutile)
glass flake+$Fe_2O_3$
glass flake+$Fe_3O_4$
glass flake+$TiFe_2O_5$
glass flake+$Cr_2O_3$
glass flake+$ZrO_2$
glass flake+$Sn(Sb)O_2$
glass flake+BiOCl
glass flake+$Al_2O_3$
glass flake+$Ce_2S_3$
glass flake+$MoS_2$ In general, the layer thickness ranges from 0.1 to 1000 nm, preferably from 0.2 to 300 nm. The optical layer thickness will in general be adapted to the particular application. Preferred pigments are coated with one or two layers.

To enhance the light and weather stability it is frequently advisable, depending on the field of application, to subject the coated glass flakes to a surface treatment. Useful surface treatments include for example the processes described in DE-C 22 15 191, DE-A 31 51 354, DE-A 32 35 017 or DE-A 33 34 598, DE 40 30 727 A1, EP 0 649 886 A2, WO 97/29059, WO 99/57204, U.S. Pat. No. 5,759,255. This surface treatment further enhances the chemical stability of the pigments and/or facilitates the handling of the pigment, especially its incorporation into various application media.

The effect pigments of the present invention are advantageous useful for many purposes, such as the coloring of plastics, glasses, ceramic products, agriculture foils, decorative cosmetic formulations and in particular coatings, especially automotive coatings, and inks, including printing inks. All customary printing processes can be employed, for example offset printing, intaglio printing, bronze printing, flexographic printing. Furthermore they can be used as functional pigments like conductive pigments, as magnetic pigments or to make media, for example plastics, board products and papers, laser-markable.

The effect pigments of the present invention are also advantageously useful for these applications in admixture with filler pigments or transparent and hiding white, colored and black organic and inorganic pigments and also with conventional transparent, colored and black luster pigments based on metal oxide coated mica, $TiO_2$ flakes, $SiO_2$ flakes or $Al_2O_3$ flakes and coated or uncoated metal pigments, BiOCl pigments, platelet shaped iron oxides, or graphite flakes.

Additionally, the inventive pigment mixtures can contain organic or inorganic colourants, thixotropy agents, wetting agents, dispersing agents, water, organic solvent or solvent mixtures, etc.

The pigment mixtures of the invention are simple and easy to handle. The pigment mixtures can be incorporated into the system in which it is used by simple mixing. Laborious milling and dispersing procedures for the pigments are not necessary.

The coated glass flakes of the invention can be used for pigmenting and/or coating materials, printing inks, plastics, agricultural films, button pastes, for the coating of seed, for the colouring of food, coatings of foods, medicaments or cosmetic formulations. The concentration of the pigments in the system in which it is to be used for pigmenting is generally between 0.01 and 50% by weight, preferably between 0.1 and 5% by weight, based on the overall solids content of the system. This concentration is generally dependent on the specific application.

Plastics comprising the pigment mixture of the invention in amounts of 0.1 to 50% by weight, in particular from 0.5 to 7% by weight, are frequently notable for a particular brilliance.

In the coating sector, especially in automotive finishing, the glass flakes are employed in amounts of 0.5 to 10% by weight.

In the pigmentation of binder systems, for example for paints and printing inks for intaglio, offset or screen printing, the pigment is incorporated into the printing ink in amounts of 2–50% by weight, preferably 5–30% by weight and in particular 8–15% by weight.

The invention likewise provides pigment preparations comprising coated glass flakes, optionally effect pigments, binders and, if desired, additives, the said preparations being in the form of substantially solvent-free, free-flowing granules. Such granules contain up to 95% by weight of the inventive pigments. A pigment preparation in which the glass flakes of the invention are pasted up with a binder and with water and/or an organic solvent, with or without additives, and the paste is subsequently dried and brought into a compact particulate form, e. g. granules, pellets, briquettes, a masterbatch or tablets, is particularly suitable as a precursor for printing inks.

The present invention therefore also provides formulations containing the pigments of the invention.

In order to further illustrate the invention, various non-limiting examples are set forth below. In these, as well as throughout the balance of this specification and claims, all parts and percentages are by weight and all temperatures are in degrees centigrade unless otherwise indicated.

EXAMPLES

Example 1 (Rutile Silver Pigment) Prior Art 200 g flakes of E-glass (thickness: 5 µm; diameter: 10–40 µm; specific surface area: approximately 0.2 m²/g) are suspended in 2 l of deionized water. With vigorous stirring the suspension is heated to 80° C. After having adjusted the pH to 2.0 with dilute HCl a first layer of $SnO_2$ is precipitated onto the glass flakes by feeding a solution of 3 g $SnCl_4 \times 5$ $H_2O$ (in 10 ml conc. HCl plus 50 ml of DI water) into the suspension under simultaneous neutralization with 10% NaOH over a period of about 1 h. To complete the reaction the suspension is kept stirring for another 15 min. The coating is continued by adjusting the pH to 1.8 with dilute HCl and then titrating 63.5 ml of $TiCl_4$-solution (400 g $TiCl_4$/DI water) against 10% NaOH over a period of about 3 h. Having reached the desired layer thickness the coating is stopped, stirred for another 15 min, filtered, washed with DI water and dried. After calcination at 800° C. for 30 min a silverwhite rutile pigment is yielded.

Example 2 (Rutile Silver Pigment)

200 g flakes of E-glass (thickness: 0.5 µm; diameter: 10–40 µm; specific surface area: approximately 1.7 m²/g) are suspended in 2 l of DI water. The coating is carried out the same way as in example 1. Titration periods keep the same, only the amounts of solutions are adjusted to the different base material:
5 g $SnCl_4 \times 5$ $H_2O$ (in 15 ml conc. HCl plus 75 ml DI water)
196.3 ml of $TiCl_4$ solution (400 g $TiCl_4$/l DI water)
After calcination at 800° C. for 30 min a brilliant silver-white rutile pigment is yielded.

Examples 3 and 4 (Rutile Interference Green Pigment)

The coatings are started in the same ways as for examples 1 and 2, only the amount of $TiO_2$ (400 g $TiCl_4$/l DI water) coated was increased to yield green interference type pigments. The further steps are again carried out as described in examples 1 and 2.

To evaluate their properties draw down cards are made from all of these pigments. Additionally sprayed panels were prepared. The pigments based on glass flakes with a thickness of 5.0 µm and 0.5 µm are checked for their coloristics and their visual performance.

Results:
draw downcards and panels pigments with a thickness of 5.0 µm showed very weak performance making a "dilute" impression. For the silver little brilliance and little hiding effect was observed while for the green a dull colour and little brilliance are found;
a little better is the effect in the sunlight as some larger flakes show a kind of sparkle;
completely different is the situation with a thickness of 0.5 µm pigments: They exceeded comparable mica pigments regarding brilliance, lustre and (for the green) chroma;
particularly impressing is the high transparency combined with clear color;
looking with the microscope shows that the surfaces of all pigments are well and uniformly coated and that the differences result mostly from the imperfect orientation of the 5 µm particles;

The invention claimed is:

1. An effect pigment comprising a glass flake with a thickness of $\leq 1.0$ µm coated with one or more layers, and the softening point of the glass flake being $\geq 800°$ C.

2. An effect pigment according to claim 1, wherein the glass flake is coated with one or more layers of metal oxide(s), metal suboxide(s), metal oxyhalide(s), metal fluoride(s), metal chalcogenide(s), metal nitride(s), metal sulfide(s), metal carbide(s), or a mixture thereof.

3. An effect pigment according to claim 2, wherein the metal oxide is $TiO_2$, $Fe_2O_3$, $TiFe_2O_5$, a Ti suboxide, $Fe_3O_4$, $Cr_2O_3$, $Al_2O_3$, $SiO_2$, $ZrO_2$, $ZnO$, $SnO_2$, $CoO$, $Co_3O_4$, $VO_2$, $V_2O_3$, $Sn(Sb)O_2$ or a mixture thereof.

4. An effect pigment according to claim 3, wherein the glass flake is coated with $TiO_2$, $Fe_2O_3$ or a mixture of $TiO_2$ and $Fe_2O_3$.

5. An effect pigment according to claim 3, wherein $TiO_2$ is present and is in the rutile modification.

6. An effect pigment according to claim 2, wherein the coating is a metal sulfide selected from sulfides of tin, silver, lanthanum, rare earth metals, chromium, molybdenum, tungsten, iron, cobalt and/or nickel.

7. An effect pigment according to claim 1, wherein the glass flake is coated with one or two layers.

8. A method of preparing an effect pigment according to claim 1 which comprises coating the glass flake by wet chemical coating, by chemical or physical vapor deposition or electroless plating and optionally calcining the coated glass flake.

9. A plastic, coating, powder coating, paint, ink, printing ink, glass, ceramic product, agriculture foil or cosmetic formulation comprising a base material and an effect pigment of claim 1.

10. A composition comprising a base material and a conductive pigment, magnetic pigment or dopant for the laser-marking of paper or plastics, wherein said pigment is of claim 1.

11. A formulation comprising a base composition and an effect pigment according to claim 1.

12. An effect pigment of claim 1 wherein said glass flake comprises C or E glass.

* * * * *